United States Patent
Lau et al.

(10) Patent No.: US 6,589,651 B2
(45) Date of Patent: Jul. 8, 2003

(54) ADHESIVE COMPOSITIONS CONTAINING GRAFT COPOLYMERS

(75) Inventors: Willie Lau, Ambler, PA (US); Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/951,924

(22) Filed: Sep. 13, 2001

(65) Prior Publication Data

US 2002/0064652 A1 May 30, 2002

Related U.S. Application Data

(60) Provisional application No. 60/232,414, filed on Sep. 14, 2000, and provisional application No. 60/253,171, filed on Nov. 27, 2000.

(51) Int. Cl.$^7$ .............................................. B32B 27/32
(52) U.S. Cl. .................... 428/355 EN; 525/63; 525/64; 525/69
(58) Field of Search ..................... 428/355 EN; 525/63, 525/64, 69, 70, 72, 78, 80

(56) References Cited

U.S. PATENT DOCUMENTS

| | | | |
|---|---|---|---|
| 3,867,481 A | 2/1975 | Whang | 260/899 |
| 4,056,559 A | 11/1977 | Lewis et al. | 526/212 |
| 4,551,388 A | 11/1985 | Schlademan | 428/355 |
| 4,554,324 A | 11/1985 | Husman et al. | 525/301 |
| 5,006,582 A | 4/1991 | Mancinelli | 524/271 |
| 5,028,677 A | 7/1991 | Janowicz | 526/329 |
| 5,247,040 A | 9/1993 | Amick et al. | 526/286 |
| 5,264,530 A | 11/1993 | Darmon et al. | 526/194 |
| 5,521,266 A | 5/1996 | Lau | 526/200 |
| 5,578,683 A | 11/1996 | Koch et al. | 525/301 |
| 5,602,220 A | 2/1997 | Haddleton et al. | 526/172 |
| 5,703,169 A | 12/1997 | Zajaczkowski et al. | |
| 5,756,605 A | 5/1998 | Moad et al. | 526/93 |
| 5,804,632 A | 9/1998 | Haddleton et al. | 524/458 |
| 6,302,994 B1 * | 10/2001 | Kamiya et al. | 156/320 |

FOREIGN PATENT DOCUMENTS

| | | |
|---|---|---|
| WO | WO99/03905 | 1/1999 |
| WO | WO99/57167 | 11/1999 |

OTHER PUBLICATIONS

Applications of Anionic Polymerization Research, R. P. Quirk Ed, ACS Symp. Ser. 696, 208(1998); "Practical Applications of Macromonomer Techniques for the Synthesis of Comb–Shaped Copolmers", Authors S. Roos, A.H. E. Muller, M. Kaufmann, W. Siol, C. Auschra.

Journal of Polymer Science Part A: Polymer Chemistry, vol. 34, 3173 3181; "Compatibilization of the PBS/PMMA Core/Shell Latex Interface, I. Partitioning of PMMA Macromonomer in the PBA Seed Latex", Authors, V. Nelliappan, M. S. El–aasser, A. Klein, E. S. Daniels, and J. E. Roberts.

J. Macromol Sci.—Chem. A27(4) pp. 491–507 (1990), "Copolymerization of Polymethyl Methacrylate Macromers with n–Butyl Acrylate and Mechanical Properties Of the Graft Copolymers", Authors Hong–Quan Xie a nd Shi–Biao Zhou.

* cited by examiner

*Primary Examiner*—Robert Dawson
*Assistant Examiner*—Christopher M. Keehan
(74) *Attorney, Agent, or Firm*—Richard R. Clikeman

(57) ABSTRACT

The present invention provides adhesive compositions, particularly pressure sensitive adhesive compositions, comprised of from 30 weight percent to 70 weight percent of water insoluble graft copolymers dispersed in an aqueous medium. The graft copolymers are comprised of (i) from 1 weight percent to 30 weight percent of macromonomer, based on the total weight of the copolymer, wherein the macromonomer is water insoluble and has a number average molecular weight of from 2,000 to 50,000 g/mole and comprises from 85 to 100 weight percent polymerized units of at least one first ethylenically unsaturated monomer, 5 mole percent or less of polymerized mercapto-olefin compounds, and 10 weight percent or less polymerized acid-containing monomer; and (ii) from 70 weight percent to 99 weight percent of polymerized units of at least one second ethylenically unsaturated monomer, based on the total weight of the copolymer. In certain preferred embodiments, the adhesive compositions further comprise from 0.1 to 60 weight percent solids of at least one additive. The additive is selected from the group consisting of emulsifiers, defoamers, tackifiers, pigments, humectants, fillers, curing agents, thickeners, wetting agents, biocides, adhesion promoters, colorants, waxes, UV stabilizers, and antioxidants.

11 Claims, No Drawings

ADHESIVE COMPOSITIONS CONTAINING GRAFT COPOLYMERS

CROSS REFERENCE TO RELATED PATENT APPLICATIONS

This is a non-provisional application of prior pending U.S. provisional application serial No. 60/232,414 filed Sep. 14, 2000 and U.S. provisional application serial No. 60/253,171 filed Nov. 27, 2000.

The present invention relates generally to improved adhesive compositions. More particularly, the present invention relates to improved pressure sensitive adhesive compositions containing graft copolymers.

Adhesives have been used since antiquity to hold substrates together via surface attachment. The term "adhesive", as used herein, is a substance that is typically a liquid or tacky semisolid, or at least for an instant to contact and wet a surface, and be applied in a relatively thin layer to form a useful joint capable of transmitting stresses from one substrate to another. The term "pressure sensitive", as used herein, refers to adhesives which typically do not undergo hardening after they have been applied to the surface of the substrate and the joint is formed. These adhesives are capable of holding substrates together when the surfaces are mated under briefly applied pressure at room temperature.

The properties of tack, peel strength and shear resistance, which are frequently mutually exclusive properties, may be highly important in tailoring an adhesive composition that is suitable for a particular application. Tack is a measure of viscous flow under conditions of fast strain rates and low stress magnitudes and generally relates to the initial attraction of an adhesive to a substrate. Peel strength is a measure of resistance to flow at intermediate strain rates and moderate to high stress magnitudes and generally relates to the measure of bond strength between an adhesive and a substrate. Shear resistance is a measure of resistance to flow at intermediate stress magnitudes and generally relates to the internal or cohesive strength of an adhesive.

Pressure sensitive adhesives ("PSAs") may be generally comprised of rubber, acrylic or silicone based formulations and may be manufactured via such methods as solvent, emulsion, or hot melt processes. Pressure-sensitive adhesive compositions based upon aqueous emulsions and dispersions of acrylic are known and widely used. Exemplary of such pressure sensitive adhesives include, for example, graft copolymers. The term "graft copolymers", as used herein, refers to macromolecules formed when polymer or copolymer chains are chemically attached as side chains to a polymeric backbone. Generally, the side chains are of a different polymeric composition than the backbone chain. Because graft copolymers often chemically combine unlike polymeric segments in one molecule, these copolymers have unique properties compared to the corresponding random analogues. These properties include, for example, mechanical film properties resulting from thermodynamically driven microphase separation of the polymer.

The term "comb copolymer", as used herein, refers to a type of graft copolymer, where the polymeric backbone of the graft copolymer is linear, and each side chain of the graft copolymer is formed by a "macromonomer" that is grafted to the polymer backbone. The term "macromonomers", as used herein, are low molecular weight polymers having at least one functional group at the end of the polymer chain that can further polymerize with others monomers to yield comb copolymers. See e.g., Kawakami in the "Encyclopedia of Polymer Science and Engineering", Vol. 9, pp. 195–204, John Wiley & Sons, New York, 1987. The term "linear", as used herein, is meant to include polymers where minor amounts of branching has occurred through hydrogen abstraction that is normally observed in free radical polymerizations. The comb copolymers are commonly prepared by the free radical copolymerization of macromonomer with conventional monomer (e.g., ethylenically unsaturated monomers).

Comb copolymers prepared with water-insoluble macromonomers have been predominantly prepared using bulk and solution polymerization techniques. However, such processes typically involve the use of solvent or monomer as the medium in which the polymerization is conducted. The use of such materials is undesirable, for example, due to toxicity concerns. Thus, efforts recently have focused on developing methods for preparing comb copolymers that may be suitable for use as PSAs via an aqueous emulsion process.

A parameter which is frequently relevant for selecting a grafted copolymer or comb copolymer that imparts the proper balance of properties for the adhesive composition, particularly for PSA compositions, is the respective glass transition values ($T_g$) of the "hard phase" and the "soft phase". As used herein, the term "hard phase" generally refers to the polymer or copolymer side chains or grafts, whereas the term "soft phase" generally refers to the polymeric backbone of the grafted copolymer. It is generally believed that the $T_g$ of the hard phase strongly influences the shear properties of the resulting adhesive compositions.

The degree of compatibility for the hard and soft phases also effects the shear and other properties of the adhesive compositions to a lesser degree. It is important that the copolymer side chains, or grafts, have low or no compatibility with the polymeric backbone so that separate phases are formed.

Compatibility, as used herein, refers to a measure of the mutual solubility of two materials, such as the hard and soft phases of the graft or comb copolymer. Compatible blends may be characterized by (1) the existence of a single homogeneous phase which contains no discrete domains of either component, and (2) a single glass transition temperature for the blend of components as discussed in P. B. Rim and E. B. Orler, "Dependence of $T_g$ on Composition for a Compatible Polymer/Oligomer Blend", Macromolecules, Vol. 20, pp. 433–435 (1987).

In blends of polymers or blends of additives with polymers, a further aspect of compatibility relates to the differences in refractive indices between components. A lack of compatibility is generally evidenced by haziness in the dried adhesive film due to large domains of individual components of differing refractive index. Compatibility is typically favored between materials which are similar in chemical and/or physical characteristics. To effectively modify the performance of an adhesive containing graft or comb copolymers, the selected additives should preferably be at least partially compatible with the soft phase of the copolymer and have very limited, or no compatibility, with the hard phase.

U.S. Pat. No. 4,554,324 to Husman et al. ("Husman") discloses PSA compositions that comprise a polymerized acrylic or methacrylic acid ester backbone having grafted pendant polymeric moieties. The grafted pendant polymeric moieties are comprised of macromonomers that may be prepared by anionic or free-radical polymerization processes using alkali metal hydrocarbons, alkoxide salts, or free-radical initiators, respectively. The reactive double bond of the macromonomer is an acrylate or methacrylate linkage to a desired polymeric repeat unit such as styrene or methyl methacrylate.

Husman teaches the use of macromonomers with acrylic compositions to reinforce the cohesive strength, or shear resistance, of polymers as seen in shear strength while maintaining a desirable balance of other PSA properties such as peel and tack. The adhesive compositions in Husman are made into films from solvent solutions or via melt related coating processes, such as extrusion or hot melt coating. Further, Husman does not teach the use of polymeric additives such as tackifiers to improve the properties of the PSA compositions.

U.S. Pat. No. 5,006,582 to Mancinelli ("Mancinelli") discloses acrylic hot melt PSA compositions that contain acrylic comb copolymers. Mancinelli teaches that the acrylic comb copolymers, which generally consist of a methyl methacrylate macromonomer repeat unit that is linked to an acrylate or methacrylate terminal double bond, are made via group transfer polymerization. Mancinelli discloses the use of cobalt chain transfer agents to produce macromonomers with a nonacrylate type of terminal double bond that still reacts well with acrylates and methacrylates.

Mancinelli further teaches that the PSA properties and melt processability of these MMA graft copolymers can be greatly improved by adding certain classes of tackifying resins that maintain the water whiteness of the all-acrylic adhesive backbone. These types of tackifiers have improved stability to oxidation and light. The tackifiers disclosed in Mancinelli are completely hydrogenated polyaromatic copolymers blended with low levels of partially hydrogenated rosin esters.

U.S. Pat. No. 4,551,388 to Schlademan ("Schlademan") discloses acrylic hot melt PSA compositions that are prepared by copolymerizing a vinyl aromatic monomer macromolecular monomer with alkyl acrylate esters, or optionally, mixtures of alkyl acrylate esters and acrylic acids or acrylamides. The polymerization is carried out in an organic solvent using a free radical initiator. After polymerization is completed, the solvent is removed to yield a "tacky" acrylate copolymer. Schlademan does not teach the use of polymeric additives such as tackifiers to improve the properties of the PSA compositions.

U.S. Pat. No. 5,578,683 to Koch et al. ("Koch") discloses PSA compositions that contain crosslinkable grafts of a high $T_g$ macromonomer to an acrylic polymer backbone.

Other references, such as Shell Chemical Company product literature SC1757-93R ("Shell"), which provides an overview of KRATON™ Polymers, disclose that in order to process graft or block copolymers, the reinforcing, high $T_g$, phase separated domains must be dispersed by heating the copolymer above the $T_g$ of the hard phase and applying shear as in the extrusion processes. The term "block copolymer", as used herein, refers to linear macromonomers formed by attachment of different polymers or copolymers at its ends. The phase separation structure reforms on cooling.

An alternate approach disclosed in Shell is to provide processing to dissolve polymers in solvents that are capable of dissolving both the hard and soft phases of the block or graft copolymers to provide a polymer solution. These polymer solutions can then be applied by conventional coating techniques. When the solvent evaporates, the phase separation reforms and the unique properties of the copolymers are once again obtained.

Shell also discloses that in room temperature applications where flammable and/or volatile solvents are undesired, block copolymers can be dispersed into water through various processes with suitable surfactants, or other means, to form emulsions. However, coatings formed from these emulsions are discrete or agglomerated particles rather than coherent films since the physically crosslinked structure of block copolymers generally does not allow coalescence at drying temperatures below the $T_g$ of the hard phase. To remedy this, the end-user can add solvent that is capable of lowering the $T_g$ of the hard phase to these emulsions to cause coalescence at ambient temperature. However, this remedy is undesirable for many applications because it may reintroduce volatile organic compounds.

The present invention seeks to provide improved adhesive compositions containing graft copolymers for use, for example, as pressure sensitive adhesives, that do not require the need to process the compositions as a melt or extrusion, or with a solvent to achieve proper film formation and other PSA properties. Instead, the adhesive compositions comprise water-insoluble graft copolymer that are dispersed within an aqueous medium. The adhesive compositions of the present invention may be coated onto substrates at temperatures well below the $T_g$ of high $T_g$ grafts without requiring the need for melt processing. These improvements in adhesive properties may be achieved without the use of solvents in the formulation of these acrylic graft copolymer emulsion adhesives. Moreover, the adhesive compositions of the present invention may desirably exhibit enhanced peel strength and tack while maintaining excellent shear resistance at elevated operating temperatures.

The present invention is directed, in part, to improved adhesive compositions. Specifically, in one embodiment, there are provided adhesive compositions that comprise from 30 weight percent to 70 weight percent of solids that are dispersed within an aqueous medium. The solids are comprised of water insoluble graft copolymers. The copolymers, in turn, comprise from 1 weight percent to 30 weight percent water insoluble macromonomer, and from 70 weight percent to 99 weight percent of polymerized units of at least one second ethylenically unsaturated monomer, based on the total weight of the copolymer. The macromonomer used to form the graft copolymer composition has a number average molecular weight ("Mn") of from 2,000 g/mole to 50,000 g/m and comprises from 85 to 100 weight percent of at least one first ethylenically unsaturated polymerized monomer, 5 mole percent or less of polymerized mercapto-olefin compounds, and 10 weight percent or less polymerized acid-containing monomer. In certain embodiments, the percentage of grafting of the macromonomer to the monomer in the graft copolymer particles ranges from 50% to 100%.

In a preferred embodiment, the adhesive composition further comprises from 0.1 to 60 weight percent, based upon dry weight of the solids of the copolymer, of an additive. The additive may be at least one additive selected from the group consisting of emulsifiers, defoamers, tackifiers, pigments, fillers, curing agents, thickeners, wetting agents, biocides, adhesion promoters, humectants, colorants, waxes, UV stabilizers, and antioxidants.

These and other aspects of the invention will become more apparent from the following detailed description.

The present invention is directed to improved adhesive compositions, particularly PSA adhesive compositions, comprising graft copolymers. The present adhesive compositions may desirably exhibit an improved balance of properties in comparison to adhesive compositions of the prior art. In particular, the adhesive compositions of this invention may exhibit an improved balance of tack, peel strength and shear resistance, preferably without the problems associated with melt or solvent processing.

The adhesive compositions of the present invention are comprised of grafted copolymers dispersed in an aqueous medium. The grafted copolymers, which are preferably in the form of solid particles, are preferably prepared by a method that includes (a) forming a macromonomer aqueous emulsion containing one or more water-insoluble particles of macromonomer; (b) forming a monomer composition containing ethylenically unsaturated monomer; and (c) combining at least a portion of the macromonomer aqueous emulsion and at least a portion of the monomer composition to form a polymerization reaction mixture. The macromonomer and ethylenically unsaturated monomer are then polymerized in the presence of an initiator to form the graft copolymer.

The macromonomer, present in the macromonomer aqueous emulsion as water insoluble particles, may be any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight", it is meant that the macromonomer has a Mn of from 2,000 to 50,000 g/mole. Preferably, the macromonomer has a Mn of from 2,000 to 50,000 g/mole, more preferably from 4,000 to 35,000 g/mole.

The macromonomer contains, as polymerized units, at least one type of ethylenically unsaturated monomer. Preferably, the ethylenically unsaturated monomer is selected such that the macromonomer is water insoluble, i.e., the macromonomer has low or no water solubility, as previously described herein. In preferred embodiments, the macromonomer is comprised of from 50 weight percent to 100 weight percent, more preferably from 85 weight percent to 100 weight percent, and even more preferably from 90 weight percent to 100 weight percent, of at least one ethylenically unsaturated monomer.

Suitable ethylenically unsaturated monomers for use in preparing macromonomer include, for example, methacrylate esters, such as $C_1$ to $C_{18}$ normal or branched alkyl esters of methacrylic acid, including methyl methacrylate, ethyl methacrylate, n-butyl methacrylate, lauryl methacrylate, stearyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth) acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)" as used herein means that the "meth" is optionally present. For example, "(meth)acrylate" means methacrylate or acrylate.

The ethylenically unsaturated monomer can also be a functional monomer including, for example, monomers containing hydroxy, amido, aldehyde, ureido, polyether, glycidylalkyl, keto functional groups or combinations thereof. These functional monomers are generally present in the macromonomer at a level of from 0.5 weight percent to 15 weight percent and more preferably from 1 weight percent to 3 weight percent, based on the total weight of the graft copolymer. Examples of functional monomers include ketofunctional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomers can provide crosslinking, if desired.

The macromonomer also preferably contains as polymerized units 10 weight percent or less, preferably 5 weight percent or less, more preferably 2 weight percent or less and most preferably 1 weight percent or less acid containing monomer, based on the total weight of the macromonomer. In a particularly preferred embodiment, the macromonomer contains no acid containing monomer. The term "acid containing monomer", as used herein, refers to any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth) acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

As polymerized, the macromonomer is substantially (including completely) free of mercapto-olefin compounds. The term "substantially free", as used herein, means that the macromonomer contains, as polymerized, 5 mole percent or less mercapto-olefin compounds, based on the total weight of the macromonomer. Preferably, the macromomer contains 2 mole percent or less mercapto-olefin compounds, with 1 mole percent or less being more preferred. Even more preferably, the macromonomer contains 0.5 mole or less percent mercapto-olefin compounds. In certain particularly preferred embodiments, the macromonomer contains completely no (i.e., 0 mole percent) mercapto-olefin compounds. Some examples of suitable mercapto-olefin compounds are those as described in U.S. Pat. No. 5,247,000 to Amick. The mercapto-olefin compounds described in Amick have ester functional groups, which are susceptible to hydrolysis.

In a preferred embodiment of the present invention, the macromonomer is composed of at least 20 weight percent, more preferably from 50 weight percent to 100 weight percent, and most preferably from 80 to 100 weight percent of at least one α-methyl vinyl monomer, a non α-methyl vinyl monomer terminated with a α-methyl vinyl monomer, or combinations thereof. In a particularly preferred embodiment of the present invention, the macromonomer contains as polymerized units from 90 weight percent to 100 weight percent α-methyl vinyl monomers, non α-methyl vinyl monomers terminated with α-methyl vinyl monomers, or combinations thereof, based on the total weight of the macromonomer. Suitable α-methyl vinyl monomers include, for example, methacrylate esters, such as $C_1$ to $C_{18}$ normal or branched alkyl esters of methacrylic acid, including methyl methacrylate, ethyl methacrylate, butyl methacrylate, 2-ethylhexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof. An example of a non α-methyl vinyl monomer terminated with an α-methyl vinyl monomer includes styrene terminated by α-methyl styrene.

The macromonomers employed in the present invention may be prepared by a variety of methods which would be readily apparent to one skilled in the art once armed with the teachings of the present disclosure. For example, the macromonomer may be prepared by a high temperature (e.g., at least about 150° C.) continuous process such as disclosed in U.S. Pat. No. 5,710,227 or EP-A-1,010,706, published Jun. 21, 2000. In a preferred continuous process, a reaction mixture of ethylenically unsaturated monomers is passed through a heated zone having a temperature of at least 150° C., and more preferably at least 275° C. The heated zone may also be maintained at a pressure above atmospheric pressure (e.g., greater than about 30 bar). The reaction mixture of monomers may also optionally contain a solvent such as water, acetone, methanol, isopropanol, propionic acid, acetic acid, dimethylformamide, dimethylsulfoxide, methylethylketone, or combinations thereof which are stripped out of the polymer after polymerization.

The macromonomer useful in the present invention may also be prepared by polymerizing ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the macromonomer using a catalytic metal chelate chain transfer agent are disclosed in for example U.S. Pat. Nos. 4,526,945, 4,680,354, 4,886,861, 5,028,677, 5,362,826, 5,721,330, and 5,756,605; European publications EP-A-0199,436, and EP-A-0196783; and PCT publications WO 87/03605, WO 96/15158, and WO 97/34934.

In accordance with preferred embodiments of the present invention, the macromonomer may be prepared by an aqueous emulsion free radical polymerization process. It has been surprisingly and unexpectedly found that this polymerization process may be advantageously carried out without the use of prior art chain transfer agents such as, for example, mercaptans, hypophosphites, sulfates, and alcohols. Such prior art chain transfer agents may be undesirable in that they may exhibit offensive odors that may be imparted to the polymer, and may also add to the cost of the process, impart undesired functionality to the polymer, introduce undesired salts into the process, and introduce additional process steps, including product separation.

The aqueous emulsion free radical polymerization process is preferably conducted using a transition metal chelate complex as a chain transfer agent. Preferably, the transition metal chelate complex is a cobalt (II) or (III) chelate complex such as, for example, dioxime complexes of cobalt, cobalt II porphyrin complexes, or cobalt II chelates of vicinal iminohydroxyimino compounds, dihydroxyimino compounds, diazadihydroxyiminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed, for example, in U.S. Pat. Nos. 4,694,054; 5,770,665; 5,962,609; and 5,602,220. A preferred cobalt chelate complex useful in the preparation of the macromonomers of the present invention is Co II (2,3-dioxyiminobutane-$BF_2$)$_2$, the Co III analogue of the aforementioned compound, or combinations thereof. The spatial arrangements of such complexes are disclosed, for example, in EP-A-199436 and U.S. Pat. No. 5,756,605.

In preparing macromonomer by an aqueous emulsion polymerization process using a transition metal chelate chain transfer agent, at least one ethylenically unsaturated monomer may be polymerized in the presence of a free radical initiator and the transition metal chelate according to conventional aqueous emulsion polymerization techniques. Preferably, the ethylenically unsaturated monomer is an α-methyl vinyl monomer as previously described herein.

The polymerization reaction to form the macromonomer is preferably conducted at a temperature of from 20° C. to 150° C., and more preferably from 40° C. to 95° C. The solids level at the completion of the polymerization is typically from 5 weight percent to 65 weight percent, and more preferably from 30 weight percent to 50 weight percent, based on the total weight of the aqueous emulsion.

The concentration of initiator and transition metal chelate chain transfer agent used during the polymerization process is preferably chosen to obtain the desired degree of polymerization of the macromonomer. Preferably, the concentration of initiator is from 0.2 weight percent to 3 weight percent, and more preferably from 0.5 weight percent to 1.5 weight percent, based on the total weight of monomer. Preferably, the concentration of transition metal chelate chain transfer agent is from 5 ppm to 200 ppm, and more preferably from 10 ppm to 100 ppm, based on the total moles of monomer used to form the macromonomer.

The ethylenically unsaturated monomer, initiator, and transition metal chelate chain transfer agent may be added in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the macromonomer. The initiator is preferably selected based on such parameters as its solubility in one or more of the other components (e.g., monomers, water); half life at the desired polymerization temperature (preferably a half life within the range of from 30 minutes to 10 hours), and stability in the presence of the transition metal chelate. Suitable initiators include for example azo compounds such as 2,2'-azobis (isobutyronitrile), 4,4'-azobis(4-cyanovaleric acid), 2,2'-azobis [2-methyl-N-(1,1-bis(hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the macromonomer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkylsulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; $C_{12}$ to $C_{24}$ fatty alcohols, ethoxylated fatty acids or fatty amides; sodium, potassium, or ammonium salts of fatty acids, such as Na stearate and Na oleate; or combinations thereof. The amount of emulsifier in the aqueous emulsion is preferably from 0.05 weight percent to 10 weight percent, and more preferably from 0.3 weight percent to 3 weight percent, based on the total weight of the monomers.

The macromonomer aqueous emulsion may be formed in any manner known to those skilled in the art. For example, the macromonomer, produced by any known method, may be isolated as a solid (e.g., spray dried) and emulsified in water. Also, for example, the macromonomer, if prepared via an emulsion or aqueous based polymerization process, may be used as is, or diluted with water or concentrated to a desired solids level.

In a preferred embodiment of the present invention, the macromonomer aqueous emulsion is formed from the emulsion polymerization of an ethylenically unsaturated monomer in the presence of a transition metal chelate chain transfer agent as described previously herein. This embodiment is preferred for numerous reasons. For example, the macromonomer polymerization can be readily controlled to produce a desired particle size distribution (preferably narrow, e.g., polydispersity less than 2). Also, for example, additional processing steps, such as isolating the macromonomer as a solid, can be avoided, leading to better process economics. In addition, the macromonomer, macromonomer aqueous emulsion and the graft copolymer can be prepared by consecutive steps in a single reactor which is desirable in a commercial manufacturing facility.

The macromonomer aqueous emulsion useful in the present invention contains from 20 weight percent to 60 weight percent, and more preferably from 30 weight percent to 50 weight percent of at least one water insoluble macromonomer, based on the total weight of macromonomer aqueous emulsion. The macromonomer aqueous emulsion may also contain mixtures of macromonomer. Preferably, the macromonomer aqueous emulsion contains less than 5 weight percent and more preferably less than 1 weight percent of residual ethylenically unsaturated monomer, based on the total weight of macromonomer aqueous emulsion.

The water insoluble macromonomer particles preferably have a particle size to permit the formation of a graft copolymer of a desired particle size. Preferably, the macromonomer particles have a weight average particle size of from 50 nm to 600 nm, and more preferably from 80 nm to 200 nm, as measured by Capillary Hydrodynamic Fractionation technique using a Matec CHDF 2000 particle size analyzer equipped with a HPLC type Ultra-violet detector.

The macromonomer aqueous emulsion may also include one or more emulsifying agents. The type and amount of emulsifying agent is preferably selected in a manner to produce the desired particle size. Suitable emulsifying agents include those previously disclosed for use in preparing the macromonomer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of macromonomer is preferably from 0.2 weight percent to 5 weight percent and more preferably from 0.5 weight percent to 2 weight percent.

The macromonomer thus prepared is preferably emulsion polymerized with an ethylenically unsaturated monomer to form a graft copolymer composition. The polymerization is preferably carried out by providing the macromonomer as water insoluble particles in an aqueous emulsion and the ethylenically unsaturated monomer in a monomer composition. In certain preferred embodiments, at least a portion of the macromonomer aqueous emulsion is combined with at least a portion of the monomer composition to form a polymerization reaction mixture that is then polymerized in the presence of an initiator.

Although in no way intending to be bound in theory, it is believed that by providing the macromonomer in the form of water insoluble macromonomer particles in an aqueous emulsion, and the ethylenically unsaturated monomer in a separate monomer composition, upon combination, the ethylenically unsaturated monomer diffuses into the macromonomer particles where the polymerization occurs. Preferably, the diffusion of the ethylenically unsaturated monomer into the macromonomer particles is evidenced by swelling of the macromonomer particles.

The monomer composition useful in the present invention preferably contains at least one kind of ethylenically unsaturated monomer. The monomer composition may contain all (i.e., 100%) monomer, or may contain monomer dissolved or dispersed in an organic solvent and/or water. Preferably, the level of monomer in the monomer composition is from 50 weight percent to 100 weight percent, more preferably from 60 weight percent to 90 weight percent, and most preferably from 70 weight percent to 80 weight percent, based on the total weight of the monomer composition. Examples of organic solvents that may be present in the monomer composition include $C_6$ to $C_{14}$ alkanes, such as, for example, hexane, heptane, octane, nonane, decane, undecane, dodecane, tridecane, and tetradecane. The organic solvent in the monomer composition will preferably be no more than 30 weight percent, and more preferably no more than 5 weight percent, based on the total weight of the monomer composition and is stripped out of the polymer after polymerization.

In addition to water and/or organic solvent, the monomer composition may also optionally contain monomers containing functional groups, such as, for example, monomers containing hydroxy, amido, aldehyde, ureido, polyether, glycidylalkyl, keto groups or combinations thereof. These other monomers are generally present in the monomer composition at a level of from 0.5 weight percent to 15 weight percent, and more preferably from 1 weight percent to 3 weight percent based on the total weight of the graft copolymer. Examples of functional monomers include ketofunctional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomer can provide crosslinking if desired.

In a preferred embodiment, the monomers in the monomer composition may be pre-emulsified in water to form a monomer aqueous emulsion. Preferably, the monomer aqueous emulsion may contain monomer droplets having a droplet size from 1 micron to 100 microns, and more preferably from 5 micron to 50 microns. Any suitable emulsifying agent may be used, such as those previously described, to emulsify the monomer to the desired monomer droplet size. Preferably, the level of emulsifying agent, if present, may be from 0.2 weight percent to 2 weight percent based on the total weight of monomer in the monomer composition.

The ethylenically unsaturated monomer of the monomer composition is preferably selected to provide the desired properties in the resulting copolymer composition. Suitable ethylenically unsaturated monomers include for example methacrylate esters, such as $C_1$ to $C_{18}$ normal or branched alkyl esters of methacrylic acid, including methyl methacrylate, ethyl methacrylate, n-butyl methacrylate, 2-ethylhexyl methacrylate, lauryl methacrylate, stearyl methacrylate, isobornyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; dienes such as 1,3-butadiene and isoprene; vinyl ethers; or combinations thereof. The ethylenically unsaturated monomer can also be an acid containing monomer or a functional monomer, such as those previously described herein. Preferably, the ethylenically unsaturated monomer of the monomer composition does not contain amino groups.

In a preferred embodiment, the monomer composition may include one or more ethylenically unsaturated monomers selected from $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; butadiene or combinations thereof.

As previously mentioned, the macromonomer aqueous emulsion and monomer composition are preferably combined to form a polymerization reaction mixture, and then polymerized in the presence of a free radical initiator to form an aqueous copolymer composition. The term "polymerization reaction mixture," as used herein, refers to the resulting mixture formed when at least a portion of the macromonomer aqueous emulsion and at least a portion of the monomer composition are combined. The polymerization reaction mixture may also contain initiator or any other additive used during the polymerization. Thus, the polymerization reaction mixture is a mixture that changes in composition as the macromonomer and monomer in the monomer composition are reacted to form graft copolymer.

The macromonomer aqueous emulsion and monomer composition may be combined in various ways to carry out the polymerization. For example, the macromonomer aqueous emulsion and the monomer composition may be combined prior to the start of the polymerization reaction to form the polymerization reaction mixture. Alternatively, the monomer composition could be gradually fed into the macromonomer aqueous emulsion, or the macromonomer aqueous emulsion could be gradually fed into the monomer composition. It is also possible that only a portion of the macromonomer aqueous emulsion and/or monomer composition be combined prior to the start of the polymerization with the remaining monomer composition and/or macromonomer aqueous emulsion being fed during the polymerization.

The initiator may also be added in various ways. For example, the initiator may be added in "one shot" to the macromonomer aqueous emulsion, the monomer composition, or a mixture of the macromonomer aqueous emulsion and the monomer composition at the start of the polymerization. Alternatively, all or a portion of the initiator can be co-fed as a separate feed stream, as part of the macromonomer aqueous emulsion, as part of the monomer composition, or any combination of these methods.

The preferred method of combining the macromonomer aqueous emulsion, the monomer composition, and initiator may depend on such factors as the desired graft copolymer composition, and ultimately, the desired PSA properties of the adhesive compositions. For example, the distribution of the macromonomer as a graft along the backbone may be affected by the concentrations of both the macromonomer and the ethylenically unsaturated monomers at the time of the polymerization. In this regard, a batch process may afford high concentration of both the macromonomer and the ethylenically unsaturated monomers at the onset of the polymerization whereas a semi-continuous process will typically keep the ethylenically unsaturated monomer concentration low during the polymerization. Thus, through the method in which the macromonomer aqueous emulsion and monomer composition are combined, it may be possible to control, for example, the number of macromonomer grafts per polymer chain, the distribution of graft in each chain, and/or the length of the polymer backbone.

Initiators, useful in polymerizing the macromonomer and ethylenically unsaturated monomer to form the graft copolymer of the present invention, may include any suitable initiator for emulsion polymerizations known to those skilled in the art. The selection of the initiator will depend on such factors as the initiator's solubility in one or more of the reaction components (e.g. monomer, macromonomer, water); and half-life at the desired polymerization temperature (preferably a half-life within the range of from 30 minutes to 10 hours). Suitable initiators include those previously described herein in connection with forming the macromonomer, such as azo compounds such as 4,4'-azobis(4-cyanovaleric acid), peroxides such as t-butyl hydroperoxide; sodium, potassium, or ammonium persulfate; redox initiator systems such as, for example, persulphate or peroxide in combination with a reducing agent such as sodium metabisulfite, sodium bisulfite, sodium formaldehyde sulfoxylate, isoascorbic acid; or combinations thereof. Metal promoters, such as iron; and buffers, such as sodium bicarbonate, may also be used in combination with the initiator. Additionally, Controlled Free Radical Polymerization (CFRP) methods such as Atom Transfer Radical Polymerization; or Nitroxide Mediated Radical Polymerization may be used. Preferred initiators include azo compounds such as 4,4'-azobis(4-cyanovaleric acid).

The amount of initiator used will depend on such factors as the copolymer desired and the initiator selected. Preferably, from 0.1 weight percent to 1 weight percent initiator is used, based on the total weight of monomer and macromonomer.

The polymerization temperature may depend on the type of initiator chosen and the desired polymerization rates. Preferably, however, the macromonomer and ethylenically unsaturated monomer are polymerized at a temperature of from room temperature to 150° C., and more preferably from 40° C. to 95° C.

The amount of macromonomer aqueous emulsion and monomer composition added to form the polymerization reaction mixture will depend on such factors, for example, as the concentrations of macromonomer and ethylenically unsaturated monomer in the macromonomer aqueous emulsion and monomer composition, respectively, and the desired copolymer composition. Preferably, the macromonomer aqueous emulsion and monomer composition are added in amounts to provide a copolymer containing as polymerized units of from 1 weight percent to 30 weight percent, more preferably from 2 weight percent to 15 weight percent, and most preferably from 2.5 weight percent to 10 weight percent macromonomer, and from 70 weight percent to 99 weight percent, more preferably from 85 weight percent to 98 weight percent, and most preferably from 90 weight percent to 97.5 weight percent ethylenically unsaturated monomer.

It would be readily apparent to one skilled in the art that other components used in conventional emulsion polymerizations may optionally be used with the methods of the present invention once armed with the teachings of this disclosure. For example, to reduce the molecular weight of the resulting graft copolymer, the polymerization may optionally be conducted in the presence of one or more chain transfer agents, such as n-dodecyl mercaptan, thiophenol; halogen compounds such as bromotrichloromethane; or combinations thereof. Also, additional initiator and/or catalyst may be added to the polymerization reaction mixture at the completion of the polymerization reaction to reduce any residual monomer, (e.g., chasing agents). Suitable initiators or catalysts include those initiators previously described herein. In addition, the chain transfer capacity of a macromonomer through addition-fragmentation can be utilized in part to reduce molecular weight through appropriate design of monomer compositions and polymerization conditions. See e.g., E. Rizzardo, et. al., Prog. Pacific Polym. Sci., 1991, 1, 77–88; G. Moad, et. al., WO 96/15157.

The resulting aqueous copolymer composition formed by polymerization of the macromonomer and the ethylenically unsaturated monomer in the monomer composition preferably has a solids level of from 30 weight percent to 65 weight percent and more preferably from 40 weight percent to 60 weight percent. In addition, the aqueous copolymer composition preferably contains copolymer particles that are water insoluble and have a particle size of from 60 nm to 600 nm, and more preferably from 80 nm to 200 nm. The copolymer compositions are suitable for incorporating into the aqueous emulsion-based, PSA adhesive compositions of the present invention by itself or with other additives.

In certain preferred embodiments, the graft copolymer formed has a backbone containing, as polymerized units, the ethylenically unsaturated monomer from the monomer composition, and one or more side chains, pendent from the backbone, containing the macromonomer. Preferably, each side chain is formed from one macromonomer grafted to the backbone. The number average molecular weight of the macromonomer side chains is preferably in the range of from 2,000 to 50,000 g/mole, and more preferably in the range of from 4,000 to 35,000 g/mole. The total weight average molecular weight of the graft copolymer is preferably in the range of from 50,000 to 2,000,000, and more preferably from 100,000 to 1,000,000. Weight average molecular weights as used herein can be determined by size exclusion chromatography.

The copolymer particles of the aqueous copolymer composition can be isolated, for example, by spray drying or coagulation. However, it is preferable to use the copolymer aqueous composition as is, i.e., without further processing.

In a preferred embodiment of the present invention, the polymerization is conducted in two stages. In the first stage, the macromonomer is formed in an aqueous emulsion polymerization process, and in the second stage the macromonomer is polymerized with the ethylenically unsaturated monomer in an emulsion. For efficiency, preferably these two stages are conducted in a single vessel. For example, in the first stage, the macromonomer aqueous emulsion may be formed by polymerizing in an aqueous emulsion at least one first ethylenically unsaturated monomer to form water insoluble macromonomer particles. This first stage polymerization is preferably conducted using a transition metal chelate chain transfer agent as previously described herein. After forming the macromonomer aqueous emulsion, a second emulsion polymerization is then preferably performed in the same vessel to polymerize any unreacted first ethylenically unsaturated macromonomer with at least one second ethylenically unsaturated monomer. This second stage may be conducted for example by directly adding (e.g., all at once or by a gradual feed) the monomer composition and initiator to the macromonomer aqueous emulsion. One main advantage of this embodiment is that the macromonomer does not have to be isolated, and the second polymerization can take place simply by adding the monomer composition and initiator to the macromonomer aqueous emulsion.

In another preferred embodiment of the present invention, the polymerization of the macromonomer and ethylenically unsaturated monomer is at least partially performed in the presence of an acid containing monomer, acid containing macromonomer, or combinations thereof. The acid containing monomer or acid containing macromonomer may be added in any manner to the polymerization reaction mixture. Preferably, the acid containing monomer or acid containing macromonomer is present in the monomer composition. The acid containing monomer or acid containing macromonomer may also be added as a separate stream to the polymerization reaction mixture.

The amount of acid containing monomer or acid containing macromonomer added to the polymerization reaction mixture is preferably from 0.2 weight percent to 10 weight percent, more preferably from 0.5 weight percent to 5 weight percent, and most preferably from 1 weight percent to 2 weight percent, based on the total weight of monomer and macromonomer added to the polymerization reaction mixture.

Acid containing monomers which may be used in this embodiment may include ethylenically unsaturated monomers bearing acid functional or acid forming groups such as those previously described herein.

The acid containing macromonomer useful in this embodiment is any low molecular weight polymer having at least one terminal ethylenically unsaturated group that is capable of being polymerized in a free radical polymerization process, and that is formed from at least one kind of acid containing monomer. Preferably, the amount of acid containing monomer in the acid containing macromonomer is from 50 weight percent to 100 weight percent, more preferably from 90 weight percent to 100 weight percent, and most preferably from about 95 weight percent to 100 weight percent.

The acid containing macromonomer may be prepared according to any technique known to those skilled in the art such as those previously described herein. In a preferred embodiment of the present invention, the acid containing macromonomer is prepared by a solution polymerization process using a free radical initiator and transition metal chelate complex. An example of such a process is disclosed in U.S. Pat. No. 5,721,330. Preferred acid containing monomers used to form the acid containing macromonomer are α-methyl vinyl monomers such as methacrylic acid.

Although in no way intending to be bound by theory, it is believed that the acid containing macromonomer is attached to the surface of the water insoluble graft copolymer particles and provides stability. By "attached," as used herein, it is believed that the acid containing macromonomer is bound in some manner (e.g., covalent, hydrogen bonding, ionic) to a polymer chain in the particle. Preferably, the acid containing macromonomer is covalently bound to a polymer chain in the particle. It has been found that the acid containing macromonomer provides stability to the particles such that the aqueous copolymer composition produced exhibits unexpected improved shear stability; freeze thaw stability; and stability to additives in formulations, as well as reduction of coagulums during the polymerization. Although improved stability can be achieved using acid containing monomer, these benefits are most dramatic when an acid containing macromonomer is used.

In another preferred embodiment of the present invention, a macromolecular organic compound having a hydrophobic cavity is present in the polymerization medium used to form the macromonomer and/or aqueous copolymer composition. Preferably, the macromolecular organic compound is used when copolymerizing ethylenically unsaturated monomers with very low water solubility such as lauryl or stearyl acrylates and/or methacrylates. By "low water solubility" it is meant a water solubility at 25° C. to 50° C. of no greater than 50 millimoles/liter. For example, the macromolecular organic compound may be added to the monomer composition, the macromonomer aqueous emulsion, or the polymerization reaction mixture used to form the aqueous copolymer composition. Also, for example the macromolecular organic compound may be added to an aqueous emulsion of ethylenically unsaturated monomer used to form the macromonomer. Suitable techniques for using a macromolecular organic compound having a hydrophobic cavity are disclosed in, for example, U.S. Pat. No. 5,521,266.

Preferably, the macromolecular organic compound having a hydrophobic cavity is added to the polymerization reaction mixture to provide a molar ratio of macromolecular organic compound to low water solubility monomer or macromonomer of from 5:1 to 1:5000 and more preferably from 1:1 to 1:500.

Macromolecular organic compounds having a hydrophobic cavity useful in the present invention include for example cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

Monomers having low water solubility include for example primary alkenes; styrene and alkylsubstituted styrene; α-methyl styrene; vinyltoluene; vinyl esters of $C_4$ to $C_{30}$ carboxylic acids, such as vinyl 2-ethylhexanoate, vinyl neodecanoate; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth) acrylic acid such as those derived from fatty acids and fatty alcohols; multifunctional monomers such as pentaerythritol triacrylate; monomers derived from cholesterol or combinations thereof.

The aqueous copolymer composition, in addition to the copolymer particles, preferably contains less than 10 weight percent, and more preferably less than 1 weight percent of organic solvent. In a most preferred embodiment, the aqueous copolymer composition contains no organic solvent.

The adhesive compositions of the present invention may include from 30 weight percent to 70 weight percent solids of the grafted copolymer of the present invention dispersed in an aqueous medium. The adhesive compositions of the present invention may, optionally, further include from 0.1 to 60 weight percent solids of the grafted copolymer of at least one additive such as, but not limited to, tackifiers, emulsifiers, pigments, fillers, curing agents, thickeners, wetting agents, defoamers, biocides, adhesion promoters, humectants, colorants, waxes, UV stabilizers, antioxidants, and the like.

In preferred embodiments, tackifying resins may be added to the adhesive composition to increase tack and peel adhesion. However, the tackifying resin selected should preferably be compatible with the polymeric backbone, rather than the grafted polymer or macromonomer, to maintain high shear properties. Higher amounts of tackifying resins, or tackifiers, may have a negative effect on shear properties.

Additives, if used, can be added to the adhesive compositions of the present invention by any suitable technique, such as by mixing or blending, to uniformly incorporate the additive into the adhesive compositions. The additive is preferably added to the adhesive composition in the form of a liquid, an aqueous emulsion, or an emulsified solution. In more preferred embodiments, the adhesive composition of the present invention is prepared by adding an aqueous emulsion containing the graft copolymer particles dispersed therein and, optionally, any other additives, of the adhesive composition to an aqueous emulsion and agitating the combination to form a substantially uniform emulsion.

In the PSA compositions of the present invention, it is preferred that the percentage of grafting of the macromomoner side chains to the monomeric backbone ranges from 50% to 100% (i.e., all of the macromonomer in the system is grafted). Preferably, the percentage of grafting of the macromonomer to the monomeric backbone is 60% or greater, more preferably 70% or greater, and even more preferably 90% or greater. The term "percentage of grafting", as used herein, means the amount of macromonomer copolymerized onto the backbone divided by the total amount of charged macromonomer into the reaction times 100. The percentage of grafting is measured via HPLC to measure the amount of unreacted macromonomer.

It is generally believed that the $T_g$ of the hard phase strongly influences the shear properties of the resulting adhesive compositions. The degree of compatibility of the respective $T_g$ values for the hard and soft phases also effects the shear and other properties of the adhesive compositions. To achieve the necessary balance of adhesive properties, the hard phase of the graft copolymer particles dispersed within the adhesive compositions of the present invention preferably has a midpoint $T_g$ value of 40° C. or greater. More preferably, the midpoint $T_g$ value of the hard phase of the graft polymer is 70° C. or greater. Even more preferably, the midpoint $T_g$ value of the hard phase of the graft polymer is 90° C. or greater. Although the $T_g$ value of the soft phase is not as strong an influence on shear properties as the hard phase, it is preferred that the midpoint $T_g$ value of the soft phase is −20° C. The $T_g$ values set forth herein are based on measured values obtained, for example, by differential scanning calorimetry of the respective polymer.

In certain preferred embodiments, the PSA properties of the adhesive compositions of the present invention may be improved by controlling the number average molecular weight of the one or more macromonomers grafted to the polymeric backbone within the graft copolymer particles. It is generally believed that the desired balance of PSA properties is obtained when the molecular weight of the high $T_g$ graft is sufficiently high so as to cause phase separation of the high $T_g$ graft. Preferably, the number average molecular weight of the grafted macromonomer ranges from 2,000 to 50,000, and more preferably from 4,000 to 35,000.

The amount of grafted macromonomer or macromonomers, by weight percentage of the copolymer composition, within the PSA compositions of the present invention may have an influence on the resultant PSA properties of the adhesive. For example, if the amount of grafted macromonomer is below a certain value, the grafted polymer material may not provide sufficient reinforcement so as to improve shear properties. However, if the amount of grafted macromomoner is too high, the tack properties of the PSA may be reduced. Preferably, the amount, by weight percentage of the copolymer composition, of grafted macromonomer should range from 1 to 30%, more preferably from 2 to 15%, and even more preferably from 2.5 to 10% to improve shear while maintaining tack.

An adhesive article, particularly a PSA article, may be made by applying a coating of the adhesive composition of the present invention to a primary substrate and allowing the coating to dry, thereby providing an adhesive layer consisting of the solids portion of the adhesive composition covering a portion of the surface of the substrate.

The coating of adhesive composition can generally be applied to at least a portion of at least one surface of the primary substrate by any convenient method such as, for example, roll coating, wire-wound rod coating, knife coating, or curtain coating, and allowed to dry to form a dry adhesive layer on the coated portion of the surface of substrate. The adhesive composition may also be applied as a continuous coating or a discontinuous coating on the surface of the primary substrate.

In one embodiment, the adhesive or PSA composition may be applied to a surface of the primary substrate in an amount effective to provide a dry adhesive layer 5 grams per square meter ($g/m^2$) to 100 $g/m^2$ on the coated portion of the surface of the primary substrate.

In a further embodiment, the primary substrate may be a flexible, sheet-like material such as, for example, a sheet of paper, a polymer film, a textile fabric or a nonwoven fiber sheet, and the adhesive article of the present invention is correspondingly a sheet-like material such as, for example, a pressure sensitive adhesive tape, a pressure sensitive adhesive label or a pressure sensitive adhesive film.

In preferred from, the adhesive article is a PSA tape having an adhesive coated surface and an opposite non-coated surface. In a preferred embodiment, the article may include a release layer or coating, e.g., a polymer film, for temporarily covering the adhesive layer prior to use. In an alternative preferred embodiment, wherein an adhesive tape is provided in the form of a concentrically wound roll, the non-coated surface of the underlying layer of tape functions as a release layer for the adhesive layer. In yet a further preferred embodiment, the PSA article may be comprised of a face material, a layer of adhesive, a release coating, and a removable backing or liner.

The PSA composition may be applied to more than one surface of the primary substrate, for example, both sides of a strip of a polymer film may be coated to make a "double-sided" adhesive tape.

The PSA articles of the present invention can be used by removing the release layer, if present, from the article and then applying an adhesive coated surface of the adhesive article to one or more secondary substrates or to one or more portions of a single secondary substrate to form a composite article wherein the substrates or primary substrate and secondary substrate portions are bonded together by an interposed dry adhesive layer.

Preferred secondary substrates include, but are not limited to, sheet-like materials such as, for example, paper products such as papers and paperboards, cardboards, corrugated cardboards, wood, metal films, polymer films and composite substrates. The terminology "composite substrates", as used herein, means substrates consisting of a combination of dissimilar substrate materials such as polymer-coated paperboards or cardboards such, for example, wax-coated cardboard, and bonded wood products such as, for example, particle boards.

The adhesive compositions prepared in accordance with the present invention are easily coated upon suitable flexible or inflexible backing materials by conventional coating techniques to produce coated adhesive sheet materials in accord with the present invention. The flexible backing material may be any material conventionally utilized as a tape backing or any other flexible material. Typical examples of flexible backing materials employed as conventional tape backings which may be useful for the adhesive compositions of the present invention include those made of paper, plastic films such as polypropylene, polyethylene, polyvinyl chloride, polyester (e.g., polyethylene terephthalate), cellulose acetate and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metallized polymeric films, or ceramic sheet materials. The coated sheet materials may take the form of any article conventionally known to be utilized with adhesive or PSA compositions such as labels, tapes, signs, covers, marking indicia, and the like.

The PSA compositions of the present invention may also be suitable for use as removable adhesives. Ideal removable adhesives will not increase excessively in peel strength with time or exposure to heat and high humidity. Further, adhesive tapes made from such compositions should not whiten on exposure to high humidity or should not lift at the edges or form tunnels due to expansion of the tape backing when exposed to elevated temperatures. Certain PSA compositions of the present invention may exhibit no change in peel strength despite extended exposure to heat and humidity.

The PSA compositions of the present invention may also be suitable for high temperature adhesive systems. For example, certain PSA compositions of the present invention may exhibit high temperature shear resistance at temperatures approaching the $T_g$ of the grafted macromonomer.

EXAMPLES

The invention is further described in the following examples. All of the examples are actual examples. These examples are for illustrative purposes only.

In the examples, monomer conversion was determined by GC analysis of unreacted monomer using standard methods. Weight percent solids for the macromonomer and copolymer compositions were determined by gravimetric analysis. Particle size of the macromonomer and copolymer compositions were obtained using a Matec CHDF 2000 particle size analyzer equipped with a HPLC type Ultra-violet detector. The midpoint $T_g$ values were measured using a differential scanning calorimeter (Model 12920, TA Company) by scanning the temperature range of −100° C. to +150° C. at a rate of 20° C. per minute and reporting the midpoint of the $T_g$ transition provided by the scan as the $T_g$ value for the polymer.

Except where noted differently, the macromonomer and monomer were measured for number average molecular weight by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

The percentage of grafting was measured via HPLC to determine the amount of unreacted macromonomer. The copolymer compositions were dissolved in THF and analyzed by gradient elution on a LC-18 column supplied by Supelco, located in Bellefonte, Pa., such that a well-isolated peak was observed for the unreacted macromonomer. Quantification was carried out by calibrating the detector response using known standards of the same macromonomer employed in the synthesis.

The following abbreviations shown in Table 1 are used in the examples:

TABLE 1

Abbreviations

| Abbreviation | |
|---|---|
| A-16-22 | Polystep A-16-22, anionic surfactant, supplied as 22% solids by Stepan Company, located in Northfield, Illinois. |
| APS | Ammonium Persulphate |
| BA | Butyl acrylate |
| BD | Butadiene |
| BMA | Butyl methacrylate |
| CoBF | Co(II)-(2,3-dioxyiminobutane-BF$_2$)$_2$ |
| CVA | 4,4-azobis(4-cyanovaleric acid) |
| Fe | 0.15% Ferrous sulfate in water |
| DBS | Dodecyl benzene sulfonate |
| GC | Gas chromatograph |
| SEC | Size exclusion chromatography |
| HPLC | High performance liquid chromatography |
| Init. | Initiator |
| IR | Infrared spectroscopy |
| LCCC | Liquid chromatography under critical conditions |
| MAA | Methacrylic acid |
| MMA | Methyl methacrylate |
| Mn | Number average molecular weight (measured in grams/mole) |
| MW | Molecular weight |
| NaMBS | Sodium metabisulfite |
| NaPS | Sodium persulfate |
| nDDM | Dodecyl mercaptan |
| OT-100 | Aerosol OT-100, anionic surfactant, supplied as 100% active by Cytec Industries Inc., located in Morristown, New Jersey. |
| PMAA-MM | Poly-methacrylic acid macromonomer |
| PMMA | Methyl methacrylate homopolymer |
| PMMA-MM | Poly-methyl methacrylate macromonomer |
| Poly-(BA-g-BMA) | Graft copolymer of BA with BMA side chains |
| Poly-(BA-g-MMA) | Graft copolymer of BA with MMA side chains |
| Poly-(BD-g-MMA) | Graft copolymer of BD with MMA side chains |
| Surf. | Surfactant |
| Wako VA-044 | 2,2'-azobis[2-(2-imidazolin2-2yl)propane] dihydrochloride |

Example 1

Non-Grafted Polymer

A MMA polymer was prepared by an aqueous emulsion polymerization process using a conventional chain transfer agent. The polymerization was conducted in a 2-liter, four neck round bottom reaction flask equipped with a mechanical stirrer, temperature control device, condenser, monomer feed line and a nitrogen inlet according to the following procedure. To the reaction flask were added 483.7 g of deionized water, 2.0 g of A-16-22, and 1.55 g of an aqueous solution containing 52 wt. % methyl-β-cyclodextrin to form a surfactant solution. A monomer emulsion containing 125 g of deionized water, 3 g of A-16-22, 305 g of MMA and 5 g of nDDM was prepared separately. Additionally, an initiator solution was prepared by dissolving 1.56 g of NaPS in 72.3 g of deionized water. The surfactant solution was heated to 80° C. after which 60% of the total initiator solution was added to the reaction flask. The monomer emulsion and the remaining initiator solution were then fed over a period of 60 minutes. At the end of the feed period, the reaction mixture was maintained at 80° C. for an additional 30 minutes, followed by cooling and filtering. The resulting low molecular weight MMA emulsion contained 31.0 wt % solids. The MMA polymer had a number average molecular weight (Mn) of 21700.

Example 2

Preparation of PMAA-MM by Solution Polymerization

A MAA macromonomer (PMAA-MM) was prepared by an aqueous solution polymerization process in a 2-liter, baffled flange flask equipped with a mechanical stirrer, condenser, temperature control device, initiator feed lines and a nitrogen inlet. The flask was purged with nitrogen for 30 minutes and 0.018 g of CoBF was added. The flask was charged with 1,080 g of degassed water which was heated to 55° C. under a nitrogen purge. A monomer mixture containing 510 ml of MAA and 0.01 g of COBF was prepared separately under nitrogen. When the deionized water reached a temperature of 55° C., 1.94 g of initiator (Waka VA-044) was added to the reaction flask. Following the addition of the initiator, the monomer mixture was added over a period of 60 minutes to the reaction flask with stirring. The temperature was then held at 55° C. for 2 hours following the completion of the monomer mixture feed. Upon cooling the reaction flask to room temperature, the PMAA-MM macromonomer was isolated as dried polymer by rotary evaporation. The number average molecular weight (Mn) of the PMAA-MM macromonomer was determined by proton nuclear magnetic resonance to be 4030 based on the integration of the vinyl end group with respect to the methyl and methylene groups of the polymer chain.

Examples 2.1 to 2.3

Preparation of PMMA-MM by Emulsion Polymerization

A MMA macromonomer (PMMA-MM) was prepared by emulsion polymerization processes using the same equipment described in Example 1. The specific amounts of water, surfactant, MMA, chain transfer agent (CTA), and initiator used in Examples 2.1, 2.2, and 2.3 are shown in Table 2. These ingredients were added according to the following procedure. In a different flask from the reaction flask, a monomer solution was prepared by dissolving the chain transfer agent in MMA under a nitrogen purge. Deionized water and surfactant (OT-100) were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (CVA) was added to the water surfactant solution with stirring for 1 minute to permit the initiator to dissolve. After dissolution of the initiator, 20 percent by weight of the monomer solution was added to the reaction flask with stirring. Following this initial charge, the remaining monomer solution was fed over a period of 1 to 2 hours, with stirring, to form a reaction mixture. At the end of the feed period, the reaction mixture was maintained at 80° C. for an additional 1 to 3 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of macromonomer, and the conversion of monomer was over 99 weight percent, based on the total weight of monomer added. The Mn, weight percent solids and particle size for each macromonomer are reported in Table 2.

TABLE 2

Preparation of PMMA-MM

| Example | $H_2O$ (g) | Surf. (g)[3] | MMA (g) | CTA $g^{(1)}$ | Init. $(g)^{(2)}$ | Part. Size (nm) | Mn | Wt % Solid |
|---|---|---|---|---|---|---|---|---|
| 2.1 | 720 | 3.6 | 324 | 0.016 | 3.6 | 158 | 9656 | 31.0 |
| 2.2 | 1440 | 7.2 | 720 | 0.046 | 7.2 | 157 | 7237 | 32.0 |
| 2.3 | 720 | 3.6 | 360 | 0.11 | 3.6 | 230 | 1592 | 27.0 |

[1]Weight in gram of chain transfer agent (CoBF),
[2]CVA, supplied by Aldrich as a 75 weight percent aqueous solution of initiator.
[3]OT-100.

Examples 3.1 to 3.6

Preparation of Poly-(BA-g-MMA) Graft Copolymers by Batch Emulsion Polymerization Process A graft copolymer having a polymeric backbone of BA and side chains of MMA was prepared in accordance with the methods disclosed herein. Batch emulsion polymerization processes were carried out in a 1-liter, four neck round bottom reaction flasks equipped with a mechanical stirrer, condenser, temperature control device, initiator feed lines and a nitrogen inlet. The specific amounts of PMMA-MM (as emulsion), water, surfactant, acid containing monomer (referred to as "acid" in Table 3), BA, initiator, and buffer used are shown in Table 3. These ingredients were added according to the following procedure. An emulsion of deionized water (referred to as "$H_2O$ #1" in Table 3), PMMA-MM emulsion identified from the examples in Table 2 (referred to in Table 3 as "Ex" under the "PMMA-MM" column) were prepared in the reaction flask at room temperature. A monomer emulsion of deionized water (referred to as "$H_2O$ #2" in Table 3), surfactant, acid containing monomer, and BA was prepared separately. The monomer emulsion was introduced into the reaction flask at room temperature with stirring to form a reaction mixture. After stirring for 20 minutes, the reaction mixture was heated to the reaction temperature indicated in Table 3.

Once the reaction temperature was reached, an initiator and optionally a buffer were introduced into the reaction flask with stirring according to the following procedures. For examples using APS as the initiator, 20% by weight of the initiator solution was added in one shot to the reaction flask, with the remainder being fed over 1 to 2 hours. For the examples prepared with a redox initiator, all of the Fe and $Na_2CO_3$ were added to the reaction flask followed by one third of the NaPS and NaMBS, with the remainder fed over 1 to 2 hours. The reaction mixture was maintained at the reaction temperature for a period of 1 to 2 hours. The resulting copolymer composition was analyzed for conversion and other properties as described in Examples 7 through 15. The conversion of BA, as determined by standard GC methods, was greater than 99 weight percent based on the total weight of BA charged.

TABLE 3

Preparation of Poly-(BA-g-MMA) Graft Copolymers Prepared by Batch Process

| Example | PMMA-MM Ex. | PMMA-MM Amt (g) | $H_2O$ #1 (g) in Emul. 1 | $H_2O$ #2 (g) in Emul. 2 | Surf. (g) | BA (g) | Temp (° C.) | Init. (g) | Buffer [9](g) | Acid (g) |
|---|---|---|---|---|---|---|---|---|---|---|
| 3.1[8] | Comp. Ex. 1 | 11.2 | 30 | 30 | 1.1[1] | 64.7 | 90 | Redox[4] | 0.16 | 3.5 |
| 3.2 | 2.1 | 42 | 102 | 43.5 | 1.02[1] | 115 | 80 | 0.7[5] | 0 | 1.3[8] |
| 3.3 | 2.1 | 21 | 112 | 46.3 | 1.08[2] | 122.5 | 80 | Redox[3] | 0 | 1.96[7] |
| 3.4 | 2.2 | 20.2 | 20 | 76 | 2.2[1] | 121.5 | 90 | Redox[3] | 0.10 | 1.96[7] |
| 3.5 | 2.2 | 10.2 | 27 | 76 | 2.2[1] | 124.8 | 90 | Redox[3] | 0.10 | 1.96[7] |
| 3.6 | 2.3 | 12 | 36 | 20 | 1.1[1] | 25.5 | 90 | Redox[4] | 0.05 | 0.98[7] |

[1]Ethoxylated $C_8$ to $C_{18}$, alkyl ether sulfate having from 1 to 40 ethylene oxide groups per molecule (30% active in water).
[2]A-16-22
[3]Redox initiator system contained 0.14 g NaPS in 3 g water; 0.12 g NaMBS in 3 g water; and 1.4 g Fe.
[4]Redox initiator system contained 0.045 g NaPS in 3 g water; 0.04 g NaMBS in 3 g water; and 0.5 g Fe.
[5]NaPS dissolved in 5–20 g of water.
[6]MAA
[7]PMAA-MM (prepared by method of Example 2)
[8]Comparative Example prepared with PMMA having no terminal ethylenically unsaturated groups.
[9]Sodium carbonate dissolved in 5 g of water.

Example 4

Preparation of Poly-(BA-g-MMA) by Semi-continuous, or Gradual Addition, Process A graft copolymer having a backbone of BA and side chains of MMA was prepared in accordance with the method of the present invention. The graft copolymer was prepared in two stages. In the first stage, PMMA-MM was prepared in accordance with the procedure used in Examples 2.1 to 2.3, except that the amounts of ingredients shown in Table 4 were used to replace the corresponding ingredients in Table 2:

TABLE 4

Ingredients used in Preparation of MMA Macromonomer

| Ingredient | Amount Charged |
|---|---|
| $H_2O$ | 340 g |
| Surfactant (A-16-22) | 7.85 g |
| MMA | 180 g |
| CoBF | 11.1 ppm[1] |
| Initiator (CVA) | 1.8 g |

[1]Based on total moles of MMA monomer.

The resulting PMMA-MM had a Mn of 12,900.

In the second stage, a monomer emulsion containing 810 g of deionized water, 35 g of an ethoxylated $C_6$ to $C_{18}$ alkyl ether sulfate having from 0 to 40 ethylene oxide groups per molecule, and 1876 g of butyl acrylate was prepared. In addition, 31.23 g of PMAA-MM, in 190 g of water was prepared separately. The monomer emulsion and the PMAA-MM solution were then mixed together.

A quantity of 1000 g of deionized water, 295 g of the first stage PMMA-MM, and 20% of the monomer emulsion were added to a 5-liter reaction kettle. The kettle was stirred for 20 minutes, followed by heating to 85° C. (with a sweep of nitrogen). At 85° C., 1.4 g of sodium persulfate dissolved in 10 g of water and 1.44 g of sodium carbonate dissolved in 15 g of water were added to the reaction flask in a single shot, followed with 10 g of deionized water. Following the charges of initiator and buffer, the other 80% of the monomer emulsion was fed in over 30 minutes and the reaction mixture was maintained with stirring at 90° C. for 60 minutes after the feed was done. After cooling the reaction mixture to 40° C., 13 g of a 0.15% solution of $FeSO_4$ in water was added with stirring, followed by additions of t-butyl peroxide and isoascorbic acid (4.4 g and 2.14 g each in 10 g of water, respectively). A second addition of t-butyl peroxide and isoascorbic acid in the same amounts were added 15 minutes after the first one. The reaction mixture was stirred for 30 minutes at a temperature of 40° C.

The resulting latex was cooled to room temperature and passed through a filter cloth to remove any coagulum. The resulting graft copolymer produced contained 93.5 weight percent of butyl acrylate, 5 weight percent of methyl methacrylate and 1.5 weight percent of PMAA-MM.

Example 5

Random Copolymer Control

The random copolymer was prepared by a semi-continuous emulsion polymerization process in a 1-liter round bottom flask with four necks equipped with a mechanical stirrer, temperature control device, feed lines and a nitrogen inlet. A monomer emulsion of deionized water (68 g), surfactant (2.6 g of A-16-22), BA (233.8 g), MMA (12.5 g) and PMAA-MM (3.75 g of example 2) was prepared in a separate flask. The reaction flask was charged with deionized water (88.5 g) at room temperature and then heated to 84° C. while stirring under a nitrogen purge. Upon reaching the reaction temperature, the reaction flask was charged with initiator (1.03 g APS in 4.5 g of water) and buffer (1.25 g of $Na_2CO_3$ in 4.5 g of water) which was then followed by an acrylic latex polymer with particle size of 40 nm (8 g at 30% solids). The monomer emulsion was then fed into the reaction flask over a period of 90 minutes together with a solution of APS (0.35 in 19.3 g of water) and $Na_2CO_3$ (0.25 g in 19.3 g of water). Upon completion of the feeds, the reaction mixture was maintained at the reaction temperature for a period of 1 hour, cooled and filtered.

Examples 6 (6.1 through 6.23)

Preparation of Film Formulations of PSA Systems

Test emulsion polymers were prepared in accordance with the methods disclosed. Comparative test emulsion polymers were also prepared. The composition of these test emulsion polymers and comparative test emulsion polymers and molecular weights of the grafted polymers (if applicable) are disclosed in Table 5.

A quantity of 100 grams of test emulsion polymers or comparative emulsion polymers disclosed in Table 5 were added to a ½ pint container equipped with a laboratory stirrer. At moderate agitation, ACRYSOL™RM5 (3 grams) was prediluted to 10% solids and added to the test emulsion polymer and mixed. In some examples, DOWANOL™DPM coalescent (manufactured by Dow Chemical of Midland, Mich.) was prediluted with water to a level of 50% solids and added to the test emulsion polymers to yield the percent coalescent solids shown in Table 5. In other examples, TACOLYN™1070 tackifying resin (manufactured by Hercules, Inc. of Wilmington, Del.) was prediluted with water to 50% and added to the test emulsion polymers at a level to give the percent resin solids shown in Table 5. In all examples, the pressure sensitive adhesive formulations were mixed for an additional 15 minutes. The pH of the final pressure sensitive adhesive formulations was adjusted to a range between 8.0 to 9.0 by adding 0.6 grams 28% by weight solution of ammonia.

TABLE 5

Compositions of PSA formulations

| Example | Graft Copolymer (if applicable) | Tackifier | Other Additives | MW of MMA Graft | MW of MAA Graft |
|---|---|---|---|---|---|
| 6.1 Comparative | Not grafted ROBOND ™ PS-90[(1)] | No | No | N/A | N/A |
| 6.2 | Example 3.2 89 BA/10% g-MMA/1 MAA | No | No | 9,700 | N.D. |
| 6.3 | Example 3.2 89 BA/10% g-MMA/1 MAA | No | 30% DOWANOL ™ DPM Coalescent | 9,700 | N.D. |
| 6.4 | Example 3.2 89 BA/10% g-MMA/1 MAA | 40% TACOLYN ™ | No | 9,700 | N.D. |
| 6.5 | Example 3.3 94 BA/5% g-MMA/1 MAA | No | No | 9,700 | N.D. |
| 6.6 | Example 3.3 94 BA/5% g-MMA/1 MAA | No | 30% DOWANOL ™ DPM Coalescent | 9,700 | N.D. |
| 6.7 | Example 3.3 94 BA/5% g-MMA/1 MAA | 40% TACOLYN ™ | No | 9,700 | N.D. |
| 6.8 | Example 5 93.5 BA/5 MMA/1.5 g MAA | No | No | 105 (MMA monomer- not grafted) | 4,000 |
| 6.9 | Example 5 93.5 BA/5 MMA/1.5 g-MAA | 40% TACOLYN ™ | No | 105 (MMA monomer- not grafted) | 4,000 |
| 6.10 | Example 3.6 93.5 BA/5 g-MMA/1.5 g-MAA | No | No | 1,600 | 4,000 |
| 6.11 | Example 3.6 93.5 BA/5 g-MMA/1.5 g-MAA | 20% TACOLYN ™ | No | 1,600 | 4,000 |
| 6.12 | Example 3.4 93.5 BA/5 g-MMA/1.5 g-MAA | No | No | 7,200 | 4,000 |
| 6.13 | Example 3.4 93.5 BA/5 g-MMA/1.5 g-MAA | 40% TACOLYN ™ | No | 7,200 | 4,000 |
| 6.14 | Example 1 90.5 BA/4.8 MMA/4.9 g-MAA | 40% TACOLYN ™ | No | 21,700 (not grafted) | 4,000 |
| 6.15 | Example 3.5 96 BA/2.5 g-MMA/1.5 g-MAA | No | No | 7,200 | 4,000 |
| 6.16 | Example 3.5 96 BA/2.5 g-MMA/1.5 g-MAA | 40% TACOLYN ™ | No | 7,200 | 4,000 |
| 6.17 | Example 3.4 93.5 BA/5 g-MMA/1.5 g-MAA | No | No | 7,200 | 4,000 |
| 6.18 | Example 3.4 93.5 BA/5 g-MMA/1.5 g-MAA | 40% TACOLYN ™ | No | 7,200 | 4,000 |
| 6.19- gradual add | Example 4 93.5 BA/5 g-MMA/1.5 g-MAA | No | No | 12,900 | 4,000 |
| 6.20- gradual add | Example 4 93.5 BA/5 g-MMA/1.5 g-MAA | 40% TACOLYN ™ | No | 12,900 | 4,000 |
| 6.21 | Example 3.4 93.5 BA/5 g-MMA/1.5 g-MAA | 40% PICCOTEX ™ LC55 | No | 7,200 | 4,000 |
| 6.22 | Example 3.4 93.5 BA/5 g-MMA/1.5 g-MAA | 40% PERMATAC ™ H771 | No | 7,200 | 4,000 |

Example 7

Effect of Coalescing Agents on Film Formation Properties

Four test polymer emulsions, Examples 6.2, 6.3, 6.5, and 6.6 of the present invention, were prepared in accordance with the method of Example 6 to determine the film formation properties of these adhesive compositions. The emulsions were cast onto untreated polypropylene, which acts as a release substrate, to provide adhesive films having a thickness of 3.5 mils. The four sample films were then dried at 50° C. for 5 minutes to evaporate the water within the emulsion. The samples were also dried for an additional 5 days at 25° C. to allow evaporation of the coalescent in Examples 6.3 and 6.6.

The sample films were removed from the polypropylene substrate and test samples were cut from the films to dimensions of 0.5 inch by 2 inch. The tensile properties, i.e., tensile strength at break and elongation at break, of the four samples were obtained with an Instron tester using a gauge length of 1 inch and a extension rate of 1 inch/minute. The tensile properties for these four examples are provided in Table 6.

TABLE 6

Effect of Coalescent on PSA properties

| | Without Coalescent | | With Coalescent | |
|---|---|---|---|---|
| Example | Tensile Strength at Break (psi) | Elongation at break | Tensile Strength at Break (psi) | Elongation at break |
| 6.2 | 80 | 320% | | |
| 6.3 | | | 180 | 1160% |
| 6.5 | 60 | 140% | | |
| 6.6 | | | 65 | 1060% |

The results provided in Table 6 illustrate that the tensile properties of the PSA compositions of the present invention are improved through the use of coalescent agents as an additive to the adhesive composition. This is what is expected from the teachings in the art as discussed earlier (Shell product literature SC1757-93R). It might be expected that adhesive formulations with dispersions of comb copolymers that do not contain coalescent would not show good adhesive properties since tensile properties are an indication of film formation quality. However, as the examples presented in Table 6 and in the subsequent examples illustrate, good adhesive properties may also be obtained without the use of coalescent solvent.

Example 8

Test of PSA Properties

Test emulsion polymers of the present invention were prepared in accordance with the method of Example 6. Adhesive compositions 6.2 and 6.4 and compositions 6.5 and 6.7 of the present invention differ in that compositions 6.4 and 6.7 include the addition of 40% by weight percent solids of TACOLYN™, a tackifying resin. Compositions 6.2 and 6.4 and compositions 6.5 and 6.7 also differ in that compositions 6.2 and 6.4 have a higher weight percentage of the same grafted macromonomer, 10% grafted MMA, versus the 5% by weight of the grafted MMA of compositions 6.5 and 6.7.

Test adhesive tapes of the adhesive compositions in Examples 6.2, 6.4, 6.5, 6.7 and Comparative Example 6.1 were made by applying a coating of the test emulsion polymers onto 2 mil thick sheets of MYLAR™ film (manufactured by DuPont, Inc. of Wilmington, Del.) using a bird applicator. The thickness of the dried adhesive sheets was 1 mil. The sheets were dried at 50° C. for 5 minutes to remove the water from the emulsion. The coated sheets were cut into 1-inch wide strips to form adhesive test strips.

Peel strength was measuring using Pressure Sensitive Tape Council ("PSTC") Method 1. One inch test strips were prepared in accordance to the method provided above. The one inch wide test strips were applied to stainless steel panels using a 4.5 lb roller. The test strips were allowed to dwell for 20 minutes before testing peel at an angle of 180° at a rate of 12 inches per minute using a peel tester. Mode of failure is indicated by "A" for adhesive failure or "C" for cohesive failure.

The test strips for the above examples were tested for tack using the finger tack method. Finger tack is a qualitative measure of tack done by applying the index finger to the test strip and quickly removing. Tack is then rated on a scale of E (excellent), VG (very good), G (good), F (fair), to P (poor). Pluses and minuses are also used to differentiate the examples. As a control, Comparative Example 6.1, or the ROBOND™ PS-90 Emulsion (manufactured by Rohm and Haas Co. of Philadelphia, Pa.) test emulsion polymer adhesive, is used and given a rating of VG+.

The shear resistance of each of the adhesive compositions was measured in accordance with Pressure Sensitive Tape Council Method 7. One end of the strips made according to the method set forth above was applied to a stainless steel panel so that the strip contacted a 0.5 inch by 1 inch portion of one edge of the panel. The strip was trimmed so that only a 2 inch portion over hung the edge of the panel. The panel was hung in a position 2 degrees from vertical with a 1 kilogram weight suspended from the overhanging portion of adhesive strip. The time in hours required for the strip to slip off the panel was then measured and the mode of failure was also recorded. The test was conducted at 25° C. and 70° C.

The results of the peel strength, finger tack, and shear resistance for Examples 6.2, 6.4, 6.5, 6.7 and Comparative Example 6.1 are set forth in Table 7.

TABLE 7

Effect of Weight Percentage of Grafted Macromonomer and Tackifier on PSA properties

| Example | Peel (oz/in) | Finger Tack | 25° C. Shear (Hours) | 70° C. Shear (Hours) |
|---|---|---|---|---|
| 6.1 Comparative | 30 A | VG+ | 7.8 C | 0.2 |
| 6.5 (5% g-MMA) | 20 A | G | >300 | >100 |
| 6.7 (5% g-MMA; 40% TACOLYN ™) | 47 A | VG+ | 201 C | >100 |
| 6.2 (10% g-MMA) | 3.4 A | P | >425 | >114 |
| 6.4 (10% g-MMA; 40% TACOLYN ™) | 47 A | G+ | 330 C | >114 |

As the results in Table 7 show, the addition of the tackifying resin in the above examples improves the peel and finger tack properties of the adhesive composition. However, the tackifying resin additive has an adverse effect on shear properties. A higher weight percentage of grafted macromonomer within the adhesive composition improves the sheer properties but has an adverse impact on peel and finger tack properties of the PSA. In comparison to Comparative Example 6.1, the adhesives of present invention showed a dramatic increase in the shear properties while peel and tack can be maintained at a high level by the proper level of graft macromonomer.

Example 9

Test of PSA Properties to Determine Effect of MW of Graft Chains

Test emulsion polymers of the present invention, Examples 6.8, 6.9, 6.10, 6.11, 6.12, and 6.13 and Comparative Example 6.1, were prepared in accordance with the method of Example 6. Adhesive compositions 6.8 and 6.9 are comprised of 5% by weight of a monomeric MMA monomer with a number average molecular weight of 105 g/mole. Adhesive compositions 6.10 and 6.11 are comprised of 5% by weight of a grafted MMA macromonomer with a number average molecular weight of 1,600 g/mole. Lastly, adhesive compositions 6.12 and 6.13 are comprised of 5% by weight of a grafted MMA macromonomer with a number average molecular weight of 7,200 g/mole.

Test adhesive tapes of the adhesive compositions of Examples 6.8 through 6.13 and Comparative Example 6.1 were made and then tested for its peel, finger tack and shear resistance properties in accordance with the methods of Example 8. The results of these tests are presented in Table 8.

TABLE 8

Effect of the Molecular Weight of the Grafted Chain on PSA properties

| Example | MW of MMA Graft (g/mole) | Peel oz/in | Finger Tack | Shear 25° C. (Hours) | Shear 70° C. (Hours) |
|---|---|---|---|---|---|
| Comp.6.1 | — | 30 A | VG+ | 7.8 C. | 0.2 C. |
| 6.8 | 105 (MMA monomer) | 42.5 A | VG+ | 14 C. | — |
| 6.9 (40% TACOLYN ™) | 105 (MMA monomer) | 58.4 A | E+ | 17.5 C. | — |
| 6.10 | 1600 | 5.3 A | VG | 12.8 C. | 2 C. |
| 6.11 (20% TACOLYN ™) | 1600 | 48.7 A | VG+ | 4.1 C. | 0.2 C. |
| 6.12 | 7200 | 1.6 A | F | >400 | >300 |
| 6.13 (40% TACOLYN ™) | 7200 | 32 A | VG+ | >400 | >300 |

As Table 8 illustrates, the desired improvement in the balance of the PSA properties shown in Examples 6.12 and 6.13, namely, increasing the shear resistance while maintaining the peel and tack properties, are generally not obtained unless the molecular weight of the high $T_g$ graft, or the macromonomer, is sufficiently high. By contrast, Examples 6.8 and 6.9, which had monomeric MMA or, Examples 6.10 and 6.11, which had a lower molecular weight graft material of 1,600 g/mole, did not exhibit this balance of properties or improved shear performance. The required number average molecular weight of the grafted copolymer within the adhesive composition will depend upon the composition of the hard and soft phase of the graft copolymer.

Example 10

Test of PSA Properties to Determine Effect of Percentage of Grafting

Test emulsion polymers of Examples 6.13 and 6.14 were prepared in accordance with the method of Example 6. Adhesive compositions 6.13 and 6.14 are comprised of approximately 5% by weight of MMA with a number average molecular weight of 7,200 and 21,700, respectively. However, unlike Example 6.13, the MMA polymer in Example 6.14 is not grafted to BA as is Example 6.13. Both adhesive compositions, however, further comprise 40% by weight of TACOLYN™ tackifying resin. Test adhesive tapes of the adhesive compositions of Examples 6.13 and 6.14 were made and then tested for their peel and shear resistance properties in accordance with the methods of Example 8. The test tapes of the above adhesive compositions were also visually inspected for film clarity. Lastly, the percentage of grafting of the MMA polymer within the adhesive composition was measured via HPLC. The findings of these properties for the adhesive compositions of Example 6.13 and 6.14 are presented in Table 9.

TABLE 9

Effect of the Percentage of Grafting within the Copolymer on PSA Properties

| Property | Example 6.14 (21.7K MMA Seed) | Example 6.13 7.2 K Macromonomer MMA |
|---|---|---|
| Film Clarity | Slight opaque | Clear |
| % MMA grafting | None | 70% |
| Peel (oz/in) | 57 A | 32 A |
| 25° C. Shear (Hours) | 5.9 C hr | >400 hr |
| 70° C. Shear (Hours) | 0.1 C hr | >300 hr |

As Table 9 illustrates, an exemplary adhesive composition of the present invention, Example 6.13, has improved shear resistance over Example 6.14. This phenomena is attributable to the percentage, or degree, of grafting of the macromonomer to the polymer. Lastly, the film clarity of the adhesive composition of the present invention, Example 6.13, is also improved in comparison to Example 6.14.

Example 11

Effect of the Level of Graft Polymer on PSA Properties

Test emulsion polymers of Examples 6.2, 6.4, 6.5, 6.7, 6.12, 6.13, 6.15, 6.16, and Comparative Example 6.1 were prepared in accordance with the method of Example 6. The graft copolymers of Examples 6.15 and 6.16; 6.12 and 6.13; 6.5 and 6.7; and 6.2 and 6.4 are comprised of 2.5%, 5%, 5%, and 10% by weight, respectively of grafted MMA macromonomer. The number average molecular weight of the grafted MMA macromonomer for all of the Examples are above 5,000 g/mole. Further, the adhesive compositions of Examples 6.16, 6.13, 6.7, and 6.4 further comprise the addition of 40% by weight of TACOLYN™ tackifying resin.

Test adhesive tapes of the adhesive compositions of Examples 6.2, 6.4, 6.5, 6.7, 6.12, 6.13, 6.15, 6.16, and Comparative Example 6.1 were made and then tested for its peel, finger tack and shear resistance properties in accordance with the methods of Example 8. The results of these tests are presented in Table 10.

TABLE 10

Effect of the Level of Graft Polymer on PSA Properties

| Example | Peel (oz/in) | Finger Tack | 25° C. Shear (Hours) | 70° C. Shear (Hours) |
|---|---|---|---|---|
| Comparative 6.1 | 30 A | VG+ | 7.8 C | 0.2 |
| 6.15 (2.5 g-(7.2K MMA)) | 1.1 A | F+ | >282 | >190 |
| 6.16 (2.5 g-(7.2K MMA); 40% TACOLYN ™) | 46 A | VG+ + | 98 | 0.6 A |
| 6.12 (5 g-(7.2K MMA)) | 1.6 A | F | >400 | >300 |
| 6.13 (5 g-(7.2K MMA); 40%TACOLYN ™) | 32 A | VG+ | >400 | >300 |
| 6.5 (5 g-(9.7K MMA)) | 20 A | G | >300 | >100 |
| 6.7 (5 g-(9.7K MMA); 40% TACOLYN ™) | 47 A | VG+ | 201 C | >100 |
| 6.2 (10 g-(9.7K MMA)) | 3.4 A | P | >425 | >114 |
| 6.4 (10 g-(9.7K MMA); 40% TACOLYN ™) | 47 A | G+ | 330 C | >114 |

As Table 10 illustrates, lower weight percentage levels of the $T_g$ graft material, or the grafted macromonomer, such as Examples 6.15 and 6.16 will not improve the shear properties of the PSA composition as well as higher levels of the $T_g$ graft material. Further, the addition of the tackifier additive to the lower grafted level of MMA, or Example 6.16, showed an improvement in peel strength and finger tack but a reduction in shear properties. Additionally, if the amount of graft material is too high, such as in Example 6.2, the tack properties are reduced. To remedy this, a tackifier additive may be added as in Example 6.4. However the addition of the tackifier additive improves the tack properties but may have a negative effect on shear.

Example 12

Effect of Process on PSA Properties

Graft copolymers were made in accordance by either a shot (see Example 3.4) or gradual addition process (see Example 4). These graft copolymers were made into test emulsions in accordance with the method of Example 6.

Test adhesive tapes of the adhesive compositions of Examples 6.17, 6.18, 6.19, 6.20, and Comparative Example 6.1 were made and then tested for its peel, finger tack and shear resistance properties in accordance with the methods of Example 8. The results of these tests are presented in Table 11.

TABLE 11

Effect of Formation of Graft Copolymer on PSA properties

| Example | Peel (oz/in) | Finger Tack | 25° C. Shear (Hours) | 70° C. Shear (Hours) |
|---|---|---|---|---|
| Comparative 6.1 | 30 A | VG+ | 7.8 C | 0.2 |
| 6.17 SHOT | 1.6 A | F | >400 hr | >300 hr |
| 6.18 SHOT (40% TACOLYN ™ 1070) | 32 A | VG | >400 hr | >400 hr |
| 6.19 GRADUAL | 1 A | F | >336 hr | >164 hr |
| 6.20 GRADUAL (40% TACOLYN ™ 1070) | 33 A | VG | >336 hr | >164 hr |

As Table 11 illustrates, adhesive compositions containing graft copolymers that are made by either the shot or a gradual addition process and still provide desired PSA properties reflected in Table 11. Hence, the method of formulating the graft copolymer within the adhesive compositions of the present invention generally has little to no effect on the resultant PSA properties.

Example 13

Effect of Additives on the PSA Properties

Test emulsion polymers were prepared in accordance with the method of Example 6. The adhesive compositions of Examples 6.12, 6.13, 6.21, and 6.22 are comprised of the same graft copolymer: 93.5% BA/5% g-MMA/1.5% g-MAA The number average molecular weight of the grafted MMA macromonomer and grafted MAA of the copolymer are 7,200 g/mole and 4,000 g/mole, respectively. The adhesive compositions of Examples 6.12, 6.13, 6.21, and 6.22 vary in the selection of additives to the adhesive composition. The additives in the examples are all tackifying resins.

Test adhesive tapes of the adhesive compositions of Examples 6.12, 6.13, 6.21, and 6.22 were made and then tested for its peel, finger tack and shear resistance properties in accordance with the methods of Example 8. The results of these tests are presented in Table 12.

TABLE 12

Effect of Additives on the PSA Properties

| Example | Peel oz/in | Finger Tack | 25° C. Shear (Hours) | 70° C. Shear (Hours) |
|---|---|---|---|---|
| 6.12 | 1.6 A | F | >400 hr | >300 hr |
| 6.13 (40% TACOLYN ™)[1] | 32 A | VG+ | >400 hr | >300 hr |
| 6.21 (40% PICCOTEX ™)[2] | 36.5 A | VG+ | >330 | 1.2 hr C |
| 6.22 (40% PERMATEC ™)[3] | 65.5 A | E | 41 hr C | 0.2 hr C |

[1]TACOLYN ™ 1070 was manufactured by Hercules, Inc. of Wilmington, Delaware.
[2]PICCOTEX ™ LC55 was manufactured by Hercules, Inc. of Wilmington, Delaware.
[3]PERMATEC ™ J771 was manufactured by Neville Alliance Inc. of Pittsburgh, Pennsylvania.

As Table 12 illustrates, the selection of tackifying resins yields differences in the peel strength, tack, and shear properties. Tackifying resins, in general, improve the peel strength and tack of the PSA composition but has a negative effect on shear. This is evidenced in Table 12 wherein Example 6.13, comprising TACOLYN™1070, and to a lesser extent, Example 6.21 comprising PICCOTEX™ LC55, improve the properties tack and peel without greatly reducing shear. The adhesive composition of Example 6.22 comprising PERMATEC™ H771 shows more enhanced peel and tack properties, but at the expense of the shear properties. One possible explanation is that the additive of Example 6.22 may be more compatible with the high $T_g$ graft of the graft copolymer. As the results in Table 12 illustrate, the tackifying resin, selected as an additive to the adhesive composition, should preferably be more compatible with the polymeric backbone—not the reinforcing graft composition—in order to maintain high shear properties.

Example 14

Removable Adhesives

Test emulsion polymers were prepared in accordance with the method of Example 6. The adhesive composition of Example 6.12 is comprised of the following graft copolymer: 93.5% BA/5% g-MMA/1.5% g-MAA The number average molecular weight of the grafted MMA macromonomer and grafted MAA of the copolymer are 7,200 g/mole and 4,000 g/mole, respectively. The adhesive composition of Example 6.12 comprises no additives, such as tackifying resins.

Test adhesive tapes of the adhesive composition of Example 6.12 were made and tested for its peel properties in accordance with the method of Example 8. Lower peel strength values are more suitable for removable adhesive compositions. Removability was tested by evaluating the test adhesive tests under different temperature and humidity conditions. Peel strength measurements of one tape was measured after 6 days of exposure to 78° F. and 50% relative humidity conditions. Peel strength measurements of the other adhesive test tape was measured after 5 days of exposure to 130° F. and 80% relative humidity conditions followed by one day of equilibration at 78° F. and 50% relative humidity conditions. The visual appearance of both adhesive test tapes was also examined. The results of the peel tests and visual observation are presented in Table 13.

TABLE 13

PSA Compositions Used as Removable Adhesives

| Dwell | Peel (oz/in) | Appearance |
| --- | --- | --- |
| 6 Days 78° F./50% RH | 2.9 A | Clear |
| 5 Days 130° F./80% RH Plus 1 Day 78° F./50% RH | 3 A | No whitening, tunneling or lifting |

As Table 13 illustrates, there is little to no change in peel value under the varied conditions of temperature and humidity. Further, in both instances, the test adhesive tapes removed cleanly from the substrate leaving no visible residuals or ghosting.

Example 15

High Temperature Adhesive Compositions

Test emulsion polymers were prepared in accordance with the method of Example 6.

Test adhesive tapes of the adhesive composition of Example 6.7 was made and then tested for its peel, finger tack and shear resistance properties in accordance with the methods of Example 8. Further, after the shear test had proceeded for 300 hours without failure at a temperature of 70° C., the temperature was increased to 95° C. and the shear resistance, in hours, was measured at this new temperature. The results of these tests are presented in Table 14.

TABLE 14

Evaluation of PSA Compositions Under High Temperatures

| Example | Peel oz/in | Finger Tack | 25° C. ½ in² Shear (Hours) | 70° C. ½ in² Shear (Hours) | 95° C. ½ in² Shear (Hours) |
| --- | --- | --- | --- | --- | --- |
| 6.7 (40% TACOLYN ™ 1070) | 47 A | VG+ | 201 C. | >300 | >90 |

As table 14 illustrates, adhesive compositions of the present invention can exhibit high temperature shear resistance up to near the $T_g$ of the hard graft phase. The shear resistance was maintained for greater than 90 hours at higher temperatures.

What is claimed is:

1. An adhesive composition comprising:
   from 30 weight percent to 70 weight percent solids dispersed in an aqueous medium, wherein the solids comprise water insoluble graft copolymers comprising:
   (i) from 1 weight percent to 30 weight percent of macromonomer, based on the total weight of the copolymer, wherein the macromonomer is water insoluble and has a number average molecular weight from 2,000 to 50,000 g/mole and a Tg of 40° C. or greater, and comprises from 85 weight percent to 100 weight percent of polymerized units of at least one first ethylenically unsaturated monomer, no polymerized mercapto-olefin compounds, and 5 weight percent or less of polymerized acid-containing monomer; and
   (ii) from 70 weight percent to 99 weight percent of polymerized units of at least one second ethylenically unsaturated monomer, based on the total weight of the copolymer; and
   wherein the copolymer further, optionally, comprises, as polymerized units, equal to or less than 5 weight percent, based on the total weight of the copolymer, of an acid-containing material selected from the group consisting of acid-containing macromonomer and acid-containing monomer.

2. An adhesive composition of claim 1 wherein the composition further comprising from 0.1 to 60 weight percent of said solids of said copolymer of at least one additive selected from the group consisting of emulsifiers, defoamers, tackifiers, pigments, humectants, fillers, curing agents, thickeners, wetting agents, biocides, adhesion promoters, colorants, waxes, UV stabilizers, and antioxidants.

3. An adhesive composition of claim 2 wherein the additive comprises a tackifier.

4. An adhesive composition of claim 1 wherein the macromonomer comprises as polymerized units 1 weight percent or less acid containing monomer, based on the total weight of the macromonomer.

5. The adhesive composition of claim 1 wherein the graft copolymer comprises a backbone and one or more side chains, wherein the side chains are pendant from the backbone and comprise the water insoluble macromonomer, and wherein the backbone comprises the polymerized units of the second ethylenically unsaturated monomer.

6. The adhesive composition of claim 5 wherein the percentage of grafting of the graft copolymer is at least 50% or greater.

7. The adhesive composition of claim 1 wherein the macromonomer has a number average molecular weight of from 4,000 to 35,000 g/mole.

8. Pressure sensitive adhesive coated sheet material comprising a flexible backing having a coating of the adhesive composition of claim 1.

9. The adhesive composition of claim 1 wherein the macromonomer comprises as polymerized units 2 weight percent or less acid containing monomer, based on the total weight of the macromonomer.

10. The adhesive composition of claim 1 wherein the macromonomer comprises as polymerized units no acid containing monomer.

11. The adhesive composition of claim 1 wherein the copolymer further, optionally, comprises, as polymerized units, equal to or less than 2 weight percent, based on the total weight of the copolymer, of an acid-containing material selected from the group consisting of acid-containing macromonomer and acid-containing monomer.

* * * * *